Oct. 28, 1958     M. N. FRIEND     2,857,843
RADIOACTIVE REFERENCE MARKER
Filed Jan. 2, 1951
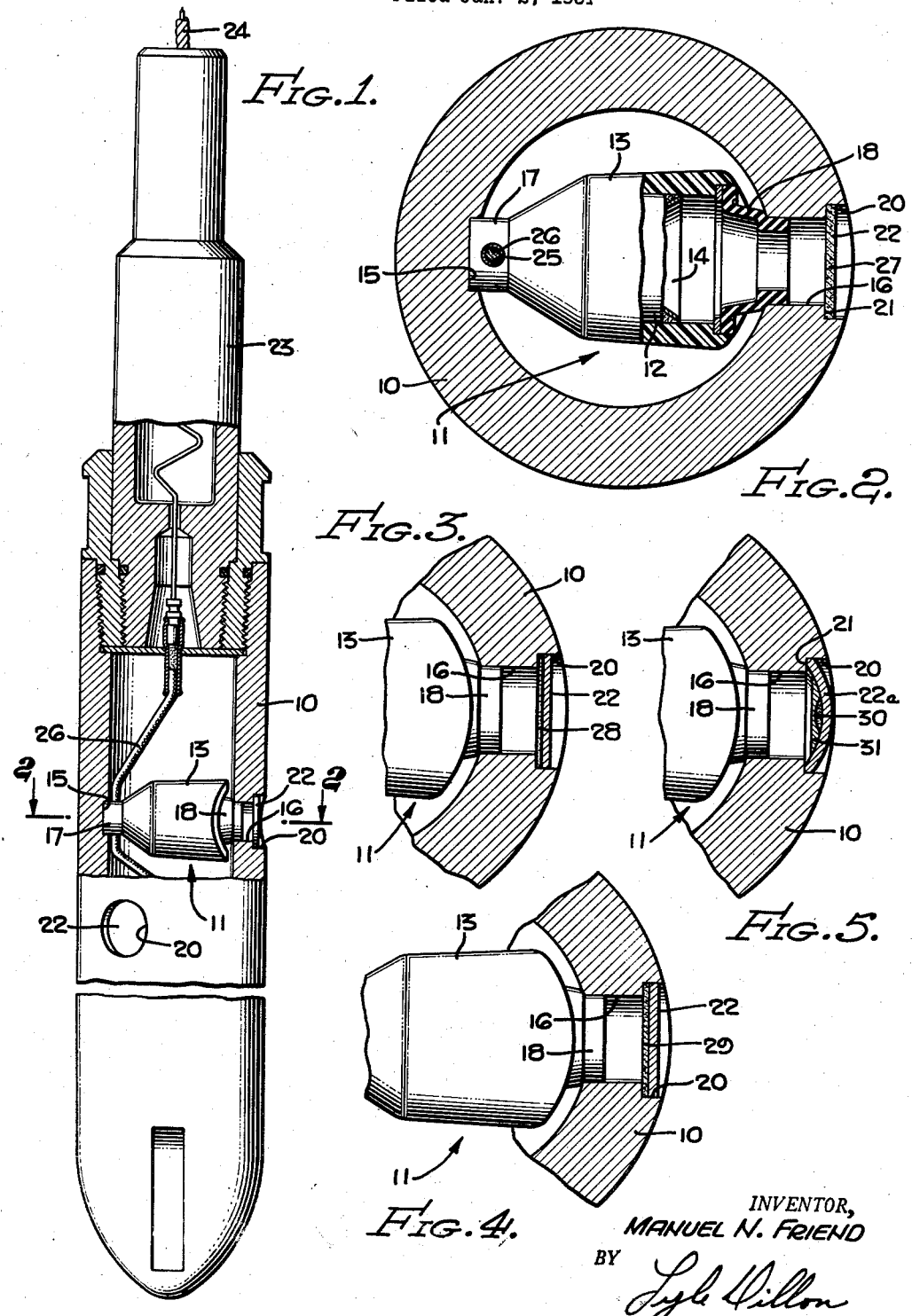
INVENTOR,
MANUEL N. FRIEND
BY
ATTORNEY

United States Patent Office 2,857,843
Patented Oct. 28, 1958

2,857,843
RADIOACTIVE REFERENCE MARKER

Manuel N. Friend, Downey, Calif., assignor, by mesne assignments, to Borg-Warner Corporation, Vernon, Calif., a corporation of Illinois Application January 2, 1951, Serial No. 203,897

9 Claims. (Cl. 102—20)

This invention relates generally to radioactivity logging of well boreholes and is more particularly concerned with methods of and apparatus for placing radioactive reference markers at fixed locations in the formations penetrated by a well borehole so that such markers may be used in the manner of permanent bench marks correlated in depth with such formations whereby the position of any such reference marker and the formations adjacent thereto may be positively and accurately relocated upon subsequent well surveying operations.

Conventional oil well drilling operations usually include the cementing of one or more strings of casings or pipe throughout a substantial portion of the length of the well borehole during and after completion of the drilling, followed by the running of a survey instrument through the length of the casing in the well, such surveying instrument being one capable of recording the relative radioactivities of the formation strata penetrated by the well borehole, with such recording being correated with borehole depth. By means of such a radioactivity log, the depth within the well borehole of penetrated formations from which oil may possibly be produced is determined, and following this, a casing or formation perforator of the bullet gun type or shaped charge explosive type may then be lowered through the borehole or casing to a position opposite the chosen formation and then the casings, surrounding cement, and a portion of the surrounding formation perforated thereby to form flow channels through which the oil may flow from the producing formation into the well casing. These perforating operations are dependent for their success upon the accuracy with which the measurements of both the depths of the well logging instrument and the perforator can be made. The maintenance of sufficient accuracy in these measurements in deep well boreholes is difficult. In modern oil wells, which frequently are drilled to depths in the order of 10,000 to 20,000 feet, the elastic characteristics of the cables upon which the survey instruments and the perforating guns are suspended within well borehole, is such that by reason of the rather wide variation in tension to which these conductor cables may be subjected under different conditions in the well boreholes, the different frictional and floatation conditions and the expansion which occurs due to a variation in the temperatures which may be encountered within the well, makes it extremely difficult to measure these depths and to repeat such measurements with the required degree of accuracy and consistency.

It is also desirable to provide means for locating the exact depth of casing perforations which have been made at some previous time within the well casing without having to rely on depth measurements made from the top of the well borehole.

In an effort to overcome the hereinbefore mentioned measurement difficulties, the practice has been adopted by some operators of establishing one or more radioactive markers of various kinds along the length of the well borehole which may be positively and accurately detected by means of a suitable radioactivity well survey instrument lowered into the well borehole, and the markers thereby employed as reference markers from which the precise location of adjacent penetrated formations may be established by relatively small measurement determinations at the top of the well borehole. Such methods are disclosed, for example, in the patents to Ennis, No. 2,228,623 and Russell, No. 2,320,890.

Many of the systems, as hereinbefore mentioned, for establishing radioactive reference points within the well borehole, have had certain disadvantages and difficulties which it is the object of the invention to overcome. By way of example, in a system heretofore employed in which radioactive paint or coating material was applied to casing collars or casing units, the setting of the casing, including the cementing process, may erode or otherwise remove the radioactive material from the casing coupling or unit, resulting in the loss of the marker and also the contamination of the adjacent formations. In the case where the marker takes the form of a quantity of radioactive material contained within a cavity in a predetermined casing unit, extensive erosion or corrosion may result later in the entire quantity of such radioactive material being released within the well and thereby seriously contaminating the adjacent formations or result in its apparent movement within the well to a different location. The false location which may thus result by displacement of the radioactive material is more serious in its consequences than a total loss of the marker. Moreover, the release of any substantial quantity of radioactive material within the well can result in sufficient contamination of the adjacent formations along the length of the borehole to render the interpretation of subsequently made radioactivity surveys difficult or substantially impossible. A disadvantage of employing a radioactive bullet shot into the formations at a given point in the well borehole, resides in the danger, especially with soft formations, that the radioactive bullet will not remain in a fixed position but may move longitudinally with respect to the axis of the well borehole, either through the penetrated and more or less shattered formation or through voids in the annular space between the outside of the well casing and the inside wall of the borehole. In some cases where the radioactive bullets have been shot into the formations of uncased boreholes they have been found to have been dislodged and carried along the borehole annulus in the body of cement introduced in the later cementing operations.

It is, therefore, among the objects of this invention to provide a novel, simple and improved method and apparatus for placing a radioactive reference marker in cased and uncased well boreholes which are not subject to the objections, disadvantages, and dangers hereinbefore encountered in the methods and apparatus heretofore employed for this purpose.

It is another object of this invention to provide a reference marker within a well borehole which will be relatively permanent.

It is a further object of this invention to provide a radioactive reference marker in the wall of a well borehole which is not susceptible to inadvertent shifting in position.

It is a still further object of this invention to introduce a radioactive reference marker into the well borehole wall which is substantially incapable of releasing radioactive material, or being released, at any given time into the well borehole or the surrounding formations.

A still further object of this invention is to provide for the establishment of a radioactive reference marker at the point of and incident to the perforation of casing within or formation surrounding the well borehole, whereby, by means of subsequently employed radioactivity well survey methods, the precise location or locations of a previous perforation or perforations within the well borehole may be established.

The objects of this invention are accomplished in general by employing a casing perforator or formation perforator of the shaped charge type in which the sealing means employed for closing the discharge openings to exclude well fluid from the shaped charge cavity by radioactive material either incorporated in the material of such seal or applied as a coating to one or more surfaces thereof, or included as a separate element, either mounted upon or together with the seal in the discharge opening. In operation of the shaped charge, the penetrating jet therefrom impinging upon the discharge opening seal will atomize or vaporize a portion of the radioactive material incorporated therein or attached thereto and carry such radioactive material along with the jet in finely divided or vaporized form into the perforation made thereby through the casing and into the adjacent formation. The finely divided or vaporized material will thus be introduced into the adjacent formation in the form of a tenaciously adhering coating or adsorbent layer on the granules of formation material.

Other objects, advantages, and features of novelty of this invention will be evident hereinafter.

In the drawings which illustrate preferred embodiments of the invention, Figure 1 is a longitudinal elevational view, partly in longitudinal section of a shaped charge type perforator, incorporating therein the apparatus of the present invention.

Figure 2 is a cross-sectional view taken on line 2—2 of Figure 1.

Figure 3 is a fragmentary cross-sectional view as taken on line 2—2 of Figure 1, illustrating an alternative modification of the invention.

Figure 4 is a fragmentary cross-sectional view as taken on line 2—2 of Figure 1, illustrating another alternative modification of the apparatus of the invention.

Figure 5 is a fragmentary cross-sectional view as taken on line 2—2 of Figure 1, illustrating a still further alternative modification of the invention.

Referring primarily to Figure 1, in which a shaped charge type of perforator gun is disclosed as an example of the general type of apparatus to which the present invention is applicable, 10 is a steel cylinder which comprises the main body or housing of the perforator and contains one or more laterally directed, shaped charge perforating units, one of which is shown at 11.

Various forms of shaped charge units may be employed, depending upon the type of perforation desired. In the present illustration, the shaped charge unit comprises a shell 13, open at the forward end and tapered in frusto-conical form toward the closed rear end. The shell 13 contains a quantity of a high explosive or detonating type of explosive as shown at 12, the explosive being shaped with a forwardly or outwardly directed conical depression as shown at 14.

The perforator body or housing 10 may be provided with a plurality of radially directed ports, one of which is shown at 16 in the drawings, and the shaped charge unit is positioned within the housing 10 in axial alignment with the center of the port 16 whereby the jet shaped blast projected from the forward end of the shaped charge will be directed radially outward through the center of the port. The inner wall of the housing 10 diametrally opposite the port 16 is formed with a suitable means to engage and support the rear end of the shaped charge shell. Such means may conveniently take the form of a cylindrically shaped recess or socket 15 into which the cylindrical rear end portion 17 of the shaped charge shell 13 is shaped to fit.

The forward end of the shaped charge unit 11 is supported in axial alignment with the center of the port opening 16 and retained in seated position within the beforementioned rear recess 15 by means of a hollow resilient retainer means as shown at 18.

The shell 13 of the shaped charge unit may be made of any suitable material such as, for example, Bakelite, Lucite, and the like plastic materials. The rear end 17 of the shell 13 has a suitable transverse opening or passage 25 therethrough, to receive a detonating fuse 26. The forward end of the explosive charge 12, adjacent the open end of the shell 13 is formed or molded with a suitable concavity, as is well known in the shaped charge art, and as illustrated at 14. Such concavity usually takes the form of a conical depression coaxial with the direction in which the penetrating explosive jet is to be directed.

The explosive charge 12, as is well known in the art, may comprise trinitrotoluene or pentaerythritol tetranitrate, as disclosed, for example, in the patent to Davis et al., No. 2,399,211, or in Muskat et al., No. 2,494,256, or any other suitable high velocity or detonating type of explosive.

The forward surface of the conical depression 14 is preferably lined with a relatively thin layer of metal conforming with the shape of the surface of the explosive as is well known in the shaped charge art.

The shaped charge perforating unit 11, including the perforator housing 10, supporting conductor cable connection and supporting means 24, firing device, which may be contained in subconnection 23, and means of supporting the shaped charge unit within the perforator body, may be constructed in accordance with or similar to those disclosed in copending applications of George F. Turechek et al., Serial No. 106,568, now Patent No. 2,662,474, or Will H. Lindsay, Jr. et al., Serial No. 106,567, now Patent No. 2,707,917.

The discharge opening or port 16 is formed with an outer annular portion 20 of slightly increased diameter, forming thereby at the juncture of the inner and outer portions thereof, an outwardly facing annular shoulder 21. The port opening is initially closed to exclude fluid from the forward concave end of the shaped charge unit and from the interior of the housing 10 prior to firing, by means of a seal disc, as shown at 22, which makes a fluid tight press fit within the beforementioned annular depression 20, and seats against the annular shoulder 21. Various types of sealing means may be employed between the edges of the seal disc 22 and the shoulder 21 to exclude the passage of fluid into the gun housing prior to the detonation of the shaped charge. Such sealing means may comprise various types of flexible gaskets or cementitious material.

In Figures 1 to 4 inclusive of the drawings, the seal disc 22 is illustrated as having the form of a plane, circular disc of uniform thickness, whereas in Figure 5, the seal member 22a is illustrated as being cup or dome shaped. This invention, however, is not limited to any particular shape of the sealing disc, member or device, as any shape or form thereof may be employed as desired or required to meet the particular design requirements of the perforator structure and fluid pressures to be encountered. The port seals are commonly made of brass, copper, or steel, with thicknesses and tensile strength as required to withstand the fluid pressures and temperatures encountered in the well borehole. Port seals, constructed as illustrated in Figure 5, in addition to being made of brass, copper or steel, may also be made of suitable brittle or disintegrable substances such as glass, porcelain, cast iron, and the like suitable ceramic and metal substances.

In the form of the invention illustrated in Figures 1 and 2, the seal disc 22 comprises a suitable metal containing in admixture therewith, preferably although not necessarily homogeneously, as illustrated at 27, a relatively small quantity of a radioactive substance or substances. Such radioactive substances may be added to the molten metal from which the seal disc is made to form in the resultant product, a homogeneous mixture or a suitable alloy.

In the form of the invention illustrated in Figure 3, the seal disc 22 is provided with a coating 28 of radioactive material preferably on the inside surface thereof. Such coating 28 may be applied to the surface of the seal disc 22 in the form of suitable coating compound containing a radioactive material such as may be formed by mixing finely divided radioactive material in varnish, lacquer, or the like suitable binder capable of drying to form a relatively hard and tenaciously adhering coating.

In the form of the invention illustrated in Figure 4, the sealing device is shown as including two adjacent discs 22 and 29. In this arrangement, the composition and physical characteristics of the inner disc 29 may be the same as that hereinbefore described in connection with the disc 22 of Figure 2, except that it may be thinner and need not have any substantial mechanical strength. The outer disc 22 may be made of any of the usual metals and constructed substantially in accordance with conventional practice, disc 22 serving only as the primary sealing member, acting to exclude fluid from the perforator body and to retain the radioactive disc 29 securely in the recess 20.

In the form of invention illustrated in Figure 5, the sealing member 22a, as hereinbefore mentioned, takes the form of a dome or cup shaped member seated in the recess 20 against the shoulder 21 with its concave surface facing outwardly of the gun housing 10, such as to efficiently resist external fluid pressure. In this form of sealing device, the materials, therefor, may comprise the usual metals or if desired, relatively brittle metals or ceramics as hereinbefore described. While the radioactive material in this case may be homogeneously mixed throughout the body of the sealing cup 22a, it is preferably cemented or otherwise suitably attached to the central portion of the inside concave surface thereof, as shown at 30. The body of radioactive material at 30, which may, if desired, be in wafer or pellet form, is preferably of relatively small diameter relative to the diameter of the sealing cup 22a whereby, upon firing of the shaped charge, the perforating jet therefrom will, upon striking the center of the sealing cup, carry substantially the whole body of radioactive material forward with it into the adjacent penetrated formation. The body of radioactive material 30 is attached to the center of the inside surface of the sealing cup 22a by suitable adhesive or cement as shown at 31. A body of radioactive material of relatively small diameter may be similarly attached to the center of a sealing disc such as shown at 22 in Figures 3 and 4 with the same advantageous results hereinbefore mentioned in connection with the sealing cup 22a.

Suitable radioactive substances for the purposes hereinbefore described are natural radioactive compounds of radium, thorium and uranium, or various ones of the artificially produced radioisotopes now available.

Artificially produced radioisotopes may be preferable to to natural radioactive materials for the reason that they are less expensive, usually stronger in gamma radiation for a given quantity thereof, and have shorter emission lives, which in some cases may be more suited to the period of time of probable use.

An example of a suitable radioisotope for the purposes hereinbefore described is cobalt 60 ($Co^{60}$). This radioisotope has the advantage of being a relatively strong emitter of gamma ray radiation and has a half life of approximately 5.3 years. Approximately .001 to .030 millicuries of such radioisotope mixed with that portion of the metal seal disc 22, as employed in Figure 2, for example, which is perforated and becomes a portion of or mixed with the penetrating jet from the shaped charge, will result in sufficient radioactive material being jetted into the penetrated formation to produce adequate deflections of the recorders of conventional radioactivity logging instruments of the type employed for radioactivity logging of well boreholes. The deflections thus produced should have several times more amplitude than the surrounding formations. Under these conditions, the location of such radioactive material, which has been jetted into the formation, will be clearly indicated in subsequent gamma ray surveys of the well borehole over a period of approximately 25 or 30 years.

The radioactive cobalt may be obtained in the form of $Co_2O_3$ or $Co_3O_4$, as supplied by the Isotopes Branch of the United States Atomic Energy Commission. Such material, as thus supplied, may contain up to as much as approximately 20 millicuries of radioactive cobalt per gram of the compound.

Each sealing disc constructed, as hereinbefore described, should contain an effective amount of $Co^{60}$ which will result from the addition to or the attachment thereto of approximately $5 \times 10^{-5}$ to approximately $1.5 \times 10^{-3}$ grams of the before-mentioned radioactive compounds, $Co_2O_3$ or $Co_3O_4$. By using a source material of lower activity, a greater amount of the compound may be used, which may be more conveniently handled in some instances. By the term effective amount as herein used is meant that amount of the radioactive compound which is removed from the disc and carried in the penetrating jet into the penetrated formation.

Another radioisotope which may be similarly employed is Europium 154 ($Eu^{154}$). Europium 154 may be obtained in the form of $Eu_2$ (oxalate$_3$) as supplied by the Isotopes Branch of the United States Atomic Energy Commission. This compound, as supplied, may contain approximately 130 millicuries of radioactive Europium per gram of the compound. This radioisotope has a half life of approximately 20 years.

Still another radioactive isotope which may be employed in a manner similar to those hereinbefore mentioned is cesium 137, which has a half life of approximately 33 years.

In operation, the shaped charge perforator of the type illustrated in Figure 1 is lowered into the well bore hole usually, although not necessarily, prior to the setting of the casing to a depth which has been selected with relation to the top or bottom of the bore hole, either by prior electrical logging or radioactivity survey operations as a suitable point for locating a radioactive reference marker. When this point has been reached, a shaped charge unit such as shown at 11 is fired, resulting in penetration of the sealing disc 22 or 22a, the surrounding casing and cement, if present, and the adjacent formation, as a result of which the radioactive material which was contained in or carried on the surface of that portion of the sealing disc 22, which is perforated by the jet from the shaped charge, is vaporized or atomized, and thereby jetted into the formation penetrated by the jet where it is permanently retained by adsorption on the formation granules and lodged in the interstices thereof.

A great advantage is obtained by such permanent radioactive reference markers as may be established by the jetting of radioactive material into the surrounding formations by means of shaped charges, among these advantages being that the reference markers can be depended upon to remain in their original positions, whereas reference points as heretofore usually employed and located at the well surface may be, and often are, destroyed by the removal of the derrick and associated equipment or by slight modification in the topography at the top of the well and the like changing conditions. Another advantage resides in the ability of such jetted markers being established as desired after one or more strings of casings have been set and cemented in the well bore hole. Another advantage resides in the simple and inexpensive method of establishing a reference marker in a well bore hole at the point of the casing perforation as an incident to such perforation, this being easily accomplished without change or modification of the shaped charge employed, the only requirement being that a seal disc containing or carrying the required radioactive material be placed in the gun port, which is to be fired at the point at which a reference marker is desired or may be conveniently located.

It is to be understood that the foregoing is illustrative only and that the invention is not to be limited thereby but includes various modifications within the skill of the art without distinguishing from the scope of the invention as defined in the appended claims.

What is claimed is:

1. In combination: a hollow perforator body; a discharge port in the wall of said body; a shaped charge in said body and positioned in alignment with said port; a relatively thin sealing member spaced from said shaped charge, forming a fluid-tight closure for said port and adapted to be penetrated by said shaped charge when fired; and a quantity of radioactive material carried by said sealing member.

2. In combination: a shaped charge adapted to produce a penetrating gaseous jet; a relatively thin body carrying a radioactive substance; and supporting means interconnecting said shaped charge and said thin body and positioning said body in spaced relation to said charge, in the path of said jet.

3. In combination: a hollow perforator body; a discharge port through the wall of said body; a shaped charge contained in said body and positioned to direct a penetrating gaseous jet outward through said port when fired; a sealing member spaced from said charge and forming a fluid-tight closure for said port; and a quantity of radioactive material attached to and confined substantially to the central portion of said sealing member which is located in the path of said jet.

4. In combination: a hollow perforator body; a discharge port through the wall of said body; a shaped charge contained in said body and positioned to direct a penetrating gaseous jet outward through said port when fired; a disintegrable sealing member spaced from said charge and forming a fluid-tight closure for said port; and a quantity of radioactive material attached to and confined substantially to the central portion of said sealing member which is located in the path of said jet.

5. In a shaped charge perforator apparatus wherein a shaped charge is contained within a hollow body and the wall of said body is provided with a discharge port through which the shaped charge is substantially centrally directed the combination therewith of: a sealing member which is relatively thin as compared to the thickness of said wall and forms a fluid-tight closure for said discharge port; and a radioactive substance carried by said sealing member.

6. Apparatus according to claim 5 in which the radioactive substance is mixed in the material of said sealing member.

7. Apparatus according to claim 5 in which the radioactive substance is attached in the form of a coating on a surface of said sealing member.

8. Apparatus according to claim 5 in which the radioactive substance is attached to the central portion of a surface of said sealing member with the marginal portions thereof substantially free of such radioactive substance.

9. Apparatus according to claim 4 in which the radioactive substance is contained in a separate body retained in said discharge port adjacent the inside surface of said sealing member.

References Cited in the file of this patent

UNITED STATES PATENTS

| 2,218,802 | McCullough | Oct. 22, 1940 |
| 2,476,137 | Doll | July 12, 1949 |
| 2,592,434 | Krasnow | Apr. 8, 1952 |

OTHER REFERENCES

"Casing Perforating With Shaped Explosive Charges," McLenore, The Oil and Gas Journal, December 28, 1946, 4 pgs.

Article by W. T. Box and R. F. Meiklejohn, published in World Oil, vol. 130, No. 4, March 1950, pages 112, 116, 118, 121, 122.